United States Patent Office 3,384,619
Patented May 21, 1968

3,384,619
PROCESS FOR MANUFACTURE OF
POLYPHENYLENE ETHERS
Takeshi Hori and Shunro Kataoka, Ohtsu-shi, and Hiroshi Kodama, Kyoto, Japan, assignors to Toyo Rayon Kabushiki Kaisha, Tokyo, Japan, a corporation of Japan
No Drawing. Filed May 18, 1967, Ser. No. 639,272
7 Claims. (Cl. 260—47)

ABSTRACT OF THE DISCLOSURE

Process for preparation of polyphenylene ethers which comprises reacting a phenol having the formula:

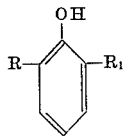

wherein R and $R_1$ are alkyl group, with oxygen in the presence of three component catalyst composed of (1) nonbasic cupric halide or cupric carboxylate, (2) tertiary amine, and (3) alcohol.

---

This invention relates to a process for the manufacture of polyphenylene ethers by the oxidation of phenols in the presence of a ternary catalyst composed of a cupric salt, a tertiary monoamine and an alcohol.

It has been known by British patent specification 930,993 to use a combination of a cuprous salt, a primary, secondary and tertiary amine as a catalyst for the oxidative self-condensation of phenols, but a catalyst composed of a cupric salt and a tertiary amine has been believed to be inactive in the oxidative self-condensation of mononuclear phenols (Brackman et al., Rec. Trav. Chem., 74, 937–955, 1955).

Of late, it was proposed to use, as a catalyst for the oxidative self-condensation of phenols, a tertiary amine and a basic cupric salt obtained (1) by reacting a cupric salt with a base, (2) by reacting a cupric salt with an alkaline salt of phenol, (3) by treating a cupric salt with an ion exchange resin having exchangeable hydroxy groups, or (4) by reacting cupric hydroxide with an inorganic acid (British patent specification 1,006,886). The polyphenylene ethers obtained by the method of this British specification, however, undergo remarkable colouration and the shaped articles obtained from this polymer are notably devoid of transparency.

An object of this invention is to provide an improved process for the manufacture of polyphenylene ethers having remarkably less colouration and exhibiting more excellent transparency when shaped into articles than the polyphenylene ethers obtained in accordance with the conventional methods.

Unexpectedly, we have found that a catalyst system obtained by adding an alcohol as an activating component to a combination of a cupric salt and a tertiary amine which it has hitherto been believed has no activity in the oxidative self-condensation of phenols, exhibits an excellent activity in the oxidative self-condensation of phenols, and that by the use of such catalytic system, polyphenylene ethers having a small degree of colouration and an excellent transparency.

According to this invention, there is provided a process for the manufacture of polyphenylene ethers which comprises reacting a phenol having the general formula:

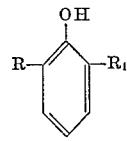

where each of R and $R_1$ is an alkyl group having 1–4 carbon atoms, with oxygen in a reaction system containing a copper salt-amine type catalyst, characterised in that the said catalyst is composed of (1) a cupric salt selected from the group consisting of cupric halides and cupric salts of a carboxylic acid having not more than 18 carbon atoms, (2) a compound of the formula: $NR_2R_3R_4$ where each of $R_2$, $R_3$ and $R_4$ is a hydrocarbon group having not more than 12 carbon atoms selected from the group consisting of alkyl, cycloalkyl and aralkyl groups and two of groups $R_2$, $R_3$ and $R_4$ may be linked to each other to form an alkylene group and form a heterocyclic group together with a nitrogen atom, and (3) an alcohol selected from the group consisting of aliphatic alcohols having not more than 6 carbon atoms, alicyclic alcohols having not more than 10 carbon atoms and aryl-substituted aliphatic alcohols having not more than 10 carbon atoms; and that the said alcohol is present in the reaction system in a concentration of 5 percent by weight.

In this invention, cupric halides such as cupric chloride, cupric bromide and cupric iodide or cupric salts of a carboxylic acid having not more than 18 carbon atoms, especially preferably a lower aliphatic acid, such as cupric acetate and cupric propionate are chosen for use as a cupric salt. Cupric halides, particularly cupric chloride, are preferable because of their ready availability. The amount of the cupric salt to be used is not particularly restricted, but generally it is preferable to use 0.1–100 mole percent, particularly 1–50 mole percent, of the cupric salt per mole of the phenol to be used.

Among tertiary amines, monoamines of the general formula: $NR_2R_3R_4$ (where $R_2$, $R_3$ and $R_4$ are as hereinabove defined) are particularly chosen for use in this invention. Catalyst systems containing as a tertiary amine component pyridine and tertiary amine having an aromatic ring directly linked to a nitrogen atom and are generally low in activity and cannot be offered for practical use. The tertiary amine used in this invention should preferably be one in which at least one group is a straight chain alkyl group.

Now, examples of the tertiary amine to be used in this invention are trialkyl amines such as trimethyl amine, triethyl amine, tripropyl amine, tributyl amine, diethylmethyl amine, cycloalkyl amines such as cyclohexyldimethyl amine, cyclohexyldiethyl amine, aralkyl amines such as dibenzylmethyl amine, tribenzyl amine and saturated heterocyclic tertiary amine compounds such as N-methyl pyrrolidine, N-methyl piperidine. It is preferable that these tertiary amines should be used in amounts of 0.1–1000 moles, particularly 1–200 moles.

On the other hand, the alcohols to be used as an activating component are aliphatic alcohols having not more than 6 carbon atoms, alicyclic alcohols having not more than 10 carbon atoms and aryl-substituted aliphatic alcohols having not more than 10 carbon atoms. As the aliphatic alcohol, we can cite monohydric alcohols such as methanol, ethanol, n-propanol, isopropanol, n-butanol, isobutanol, tert.-butanol; and polyols such as butane 1,4-diol, diethyl glycol. As the alicyclic alcohol, there can be mentioned cyclopentanol, cyclohexanol and methycyclohexanol. As the aryl-substituted aliphatic alcohol, there can be mentioned benzyl alcohol, phenethyl alcohol and phenylpropyl alcohol. Among the said alcohols, the use of a monohydric alcohol, particularly aliphatic monohydric alcohol, is preferable. An alcohol having the most excellent activating function is n-propyl alcohol. It is preferable that the alcohols should be used in amounts ranging from 1 to 1000 moles, especially from 10 to 500 moles, per mole of the cupric salt.

The phenols to be used as a starting material in this invention have the following general formula:

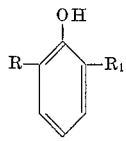

where each of R and $R_1$ is an alkyl group having 1–4 carbon atoms. Examples of such phenols are 2,6-dimethyl phenol, 2,6-diethyl phenol, 2,6-dipropyl phenol, 2,6-dibutyl phenol and 2-methyl 6-ethyl phenol. Particularly, the use of 2,6-dimethyl phenol is preferred. These phenols can be used either alone or in combination of two or more.

In accordance with the process of this invention, the oxidative self-condensation of phenols can be easily carried out by contacting phenols with oxygen in the presence of a catalyst system composed of a cupric salt, a tertiary monoamine and an alcohol. Not only pure oxygen, but also oxygen containing other inert gases, for instance, air can be used in the reaction of this invention. As the catalyst composition of this invention contains a relatively large amount of alcohol, the above-mentioned reaction can also be performed in the absence of a solvent. To make the reaction proceed smoothly, however, the use of an inert organic solvent such as benzene, toluene, nitrobenzene, tetrachloromethane and tetrachloroethane is generally recommended. When these inert organic solvents are used, it is preferable to adjust the concentration of the alcohol, an activating component of the catalyst, in the reaction system to not less than 5% by weight.

There is no particular limit on the reaction temperature, and temperatures in the range of 0° to the boiling point of the reaction mixture is preferable. Satisfactory results are obtainable by reactions at room temperature. The reaction time varies depending upon such factors as the type of the catalyst, but is is sufficient to carry out the reaction until the reaction system no longer absorbs oxygen. In general, satisfactory results are obtained if the reaction is performed for a period of 10 minutes to 5 hours.

The separation of polyphenylene ethers is carried out in the following manner.

When an alcohol, an activating component of the catalyst, is used in a relatively large amount and an organic solvent is not used, the polymer is precipitated as soon as it is formed. In the case of using a solvent, the polymer is precipitated and separated by pouring a reaction mixture into a non-solvent such as water, methanol, ethanol and acetone after the end of the reaction. In either of these cases, it is preferable to neutralize an amine present in the reaction mixture, with an acid such as hydrochloric acid.

The polyphenylene ether of this invention thus recovered has an intrinsic viscosity of 0.3–1.5. The polyphenylene ethers obtained by this invention is almost pure white in the powder form, and shaped articles obtained from this polymer have a slight light yellow colour, showing a marked excellency in transparency. To obtain the polyphenylene ethers according to this invention, therefore, an operation of removing coloured impurities positively from the polymer, which is essential in the conventional methods, is generally unnecessary.

Thus, the polyphenylene ethers obtained according to this invention can find various applications such as extrusion shaped articles, films, sheets, yarns and coatings by reason of the fact that it has excellent physical, mechanical and chemical properties and also excellent transparency.

Comparative Examples 1 and 2 of British Patent Specification 1,006,886 clearly show that a catalyst system formed from a cuprous chloride and pyridine in an organic solvent containing a small amount of ethanol exhibits an activity in the polycondensation of 2,6-dimethyl phenol, but a catalyst system obtained by substituting cupric chloride for cuprous chloride shows catalytic activity.

Unexpectedly, however, when a specific amine is used as a tertiary amine and an alcohol is used in an amount of at least 5% by weight based on the reaction system as in this invention, even the use of cupric chloride as a copper salt can give a polyphenylene ether with a high yield. In addition, the polymers obtained according to the process of this invention have a far higher degree of polymerization, undergo less colouration, and are more excellent in transparency than those obtained by the method of the said British Patent Specification in which the use of a basic cupric salt as a copper salt is specified.

The invention will now be explained with reference to the following examples by which the invention is in no way limited.

EXAMPLE I

Five grams of 2, 6-xylenol, 0.5 g. of cupric chloride, 25 g. of n-propanol and 40 g. of triethyl amine were put into 100 ml. of toluene, and oxygen was blown thereinto under stirring. In 11 minutes after the start of the introduction of oxygen, the temperature rose from 16° C. to 37° C. The resulting reaction mixture was poured into 400 ml. of methanol containing hydrochloric acid in an amount in a slight excess of that of amine to precipitate a polymer. The polymer was recovered by filtration, and after a thorough washing with methanol, vacuum dried at 70° C. There was obtained 4.4 g. of poly (2,6-dimethylphenylene ether) having an intrinsic viscosity of 0.89 (measured at 60° C. with respect to its 0.5% p-chlorophenol solution).

Powder of this polyphenylene ether was compression moulded at 300° C. to make a sheet having a thickness of 4.45 mm. The total light transmission of this sheet was found to be 70% by measurement with the use of an integrating sphere-type light transmission measuring apparatus. For the sake of comparison, the light transmission of a shaped sheet of 4.15 mm. thickness obtained from a commercially available poly (2, 6-dimethylphenylene ether) [PPO–600:N.V. POLYCHEMIE AKU GE] was measured and found to be 27%. It is understood that the product according to this Example is markedly excellent in transparency.

COMPARATIVE EXAMPLE 1

When the procedures of Example 1 were repeated except that n-propanol was not used, no reaction occurred.

COMPARATIVE EXAMPLE 2

When the reaction was carried out in the same manner as in Example 1 except that instead of the cupric chloride of Example 1, a mixture of 0.5 g. of cupric chlodide and 0.21 g. of potassium hydroxide dissolved in 5 cc. of ethanol was used, 3.5 g. of a polymer having an intrinsic viscosity of 0.51 was obtained.

The resulting polymer was difficult to shape into articles because of a small degree of polymerisation. It was observed that 1 mm. sheet shaped from this polymer was markedly coloured and had a transparency only corresponding to that of a 4.45 mm. thick sheet in Example 1.

In other words, it can be understood that the use of a basic hydroxide compound in addition to cupric chloride adversely affects the polymerisation activity of the catalyst and the properties of the resulting polymer.

EXAMPLE 2

When the reaction was carried out under the same conditions as in Example 1 using cupric bromide in place of cupric chlorida, 4.1 g. of polyphenylene ether having an intrinsic viscosity of 0.77 was obtained.

EXAMPLE 3

When the reaction was curried out under the same conditions as in Example 1 using ethanol in place of n-propanol, 3.9 g. of polyphenylene ether having an intrinscic viscosity of 0.81 was obtained.

EXAMPLE 4

When the reaction was carried out under the same conditions as in Example 1 using n-butanol in place of n-propanol, 4.4 g. of polyphenylene ether having an intrinsic viscosity of 0.73 obtained.

EXAMPLE 5

When the reaction was caried out under the same conditions as in Example 1 using tert.-butanol in place of n-propanol, 4.6 g. of polyphenylene ether having an intrinsic viscosity of 0.60 was obtained.

EXAMPLE 6

When the reaction was carried out under the same conditions as in Example 1 using cyclohexanol in place of n-propanol, 4.1 g. of polyphenylene ether having an intrinsic viscosity of 0.52 was obtained.

EXAMPLE 7

When the reaction was carried out under the same conditions as in Example 1 using benzyl alcohol in place of n-propanol, 3.5 g. of polyphenylene ether having an intrinsic viscosity of 0.38 was obtained.

EXAMPLE 8

When Example 1 was repeated using 0.5 g. of cupric acetate in place of cupric chloride, 1.9 g. of polyphenylene ether having an intrinsic viscosity of 0.33 was obtained.

EXAMPLE 9

When Example 1 was repeated using 40 g. of tri-n-propylamine in place of trietyl amine, 4.5 g. of polyphenylene ether having an intrinsic viscosity of 0.88 was obtained.

EXAMPLE 10

When Example 1 was repeated using 40 g. of tri-n-butylamine in place of triethyl amine, 4.1 g. of polyphenylene ether having an intrinsic viscosity of 0.74 was obtained.

EXAMPLE 11

When Example 1 was repeated using 40 g. of N-methylpiperidine in place of triethyl amine, 4.2 g. of polyphenylene ether having an intrinsic viscosity of 0.79 was obtained.

EXAMPLE 12

When Example 1 was repeated using 1,4-butanediol in place of n-propanol, 3,2 g. of polyphenylene ether having an intrinsic viscosity of 0.40 was obtained.

EXAMPLE 13

When Example 1 was repeated using 5.0 g. of 2, 6-diethyl phenol in place of 2, 6-xylenol, 3.6 g. of polyphenylene ether having an intrinsic viscosity of 0.41 was obtained.

EXAMPLE 14

Example 1 was repeated using a mixture of 5.0 g. of 2, 6-xylenol, 0.5 g. of cupric chloride , 40 g. of triethyl amine, toluene and n-propanol. A combined amount of toluene and n-propanol was adjusted to 100 ml. When the amount of n-propanol was varied, the yield and the intrinsic viscosity of the resulting polymer varied as shown in the following table.

| Amount of n-Propanol | Alcohol wt. percent in the reaction system | Yield of polymer | Intrinsic viscosity of polymer |
| --- | --- | --- | --- |
| 0    | 0    | 0   | ------ |
| 5    | 3.0  | 1.3 | 0.08 |
| 10   | 6.1  | 2.3 | 0.24 |
| 25   | 15.3 | 4.3 | 0.79 |
| 30   | 18.4 | 4.4 | 0.96 |
| 35   | 21.5 | 4.5 | 1.12 |
| 40   | 24.7 | 4.5 | 1.03 |
| 50   | 31.0 | 4.3 | 0.86 |
| 70   | 43.8 | 4.3 | 0.71 |
| 100  | 63.7 | 3.5 | 0.54 |

EXAMPLE 15

When Example 1 was repeated using 40 g. of tribenzyl amine in place of triethyl amine, 3.2 g. of polyphenylene ether having an intrinsic viscosity of 0.04 was obtained.

COMPARATIVE EXAMPLE 3

When Example 1 was repeated using 40 g. of pyridine in place of triethyl amine, there was no rising of the temperature nor the formation of a polymer.

We claim:
1. A process for the manufacture of polyphenylene ethers which comprises reacting a phenol having the general formula:

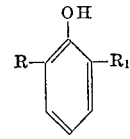

wherein each of R and $R_1$ is an alkyl group having 1–4 carbon atoms, with oxygen in a reaction system containing a copper salt-amine type catalyst, characterised in that the said catalyst is composed of (1) a nonbasic cupric salt selected from the group consisting of cupric halides and cupric salts of a carboxylic acid having not more than 18 carbon atoms, (2) a compound of the formula: $NR_2R_3R_4$ where each of $R_2$, $R_3$ and $R_4$ is a hydrocarbon group having not more than 12 carbon atoms selected from the group consisting of alkyl, cycloalkyl and aralkyl groups and two of groups $R_2$, $R_3$ and $R_4$ may be linked to each other to form an alkylene group and form a heterocyclic group together with a nitrogen atom, and (3) an alcohol selected from the group consisting of aliphatic alcohols having not more than 6 carbon atoms, alicyclic alcohols having not more than 10 carbon atoms and aryl-substituted aliphatic alcohols having not more than 10 carbon atoms; and that the said alcohol is present in the reaction system in a concentration of 5 percent by weight.

2. The process according to claim 1 wherein the said cupric salt is present in an amount of 0.1–100 mole percent based on the phenol; the said tertiary amine, in an amount of 0.1–1000 moles per mole of the cupric salt; and the said alcohol, in an amount of 1–1000 moles per mole of the cupric salt.

3. The process according to claim 1 wherein the said cupric salt is present in an amount of 1 to 50 mole percent; the said tertiary amine, in an amount of 1–200 moles per mole of the cupric salt; and the said alcohol, in an amount of 10–500 moles per mole of the cupric salt.

4. The process according to claim 1 wherein the cupric salt is cupric chloride.

5. The process according to claim 1 wherein the tertiary amine is trialkyl amine.

6. The process according to claim 1 wherein the alcohol is a lower monoalcohol.

7. The process according to claim 1 wherein the alcohol is n-propanol.

References Cited

UNITED STATES PATENTS 3,306,875  2/1967  Hay _____ 260—47

WILLIAM H. SHORT, *Primary Examiner.*

M. GOLDSTEIN, *Assistant Examiner.*

UNITED STATES PATENT OFFICE
CERTIFICATE OF CORRECTION

Patent No. 3,384,619                          May 21, 1968

Takeshi Hori et al.

It is certified that error appears in the above identified patent and that said Letters Patent are hereby corrected as shown below:

In the heading to the printed specification, between lines 7 and 8, insert -- Claims priority, application Japan, May 21, 1966, 41/32051 --.

Signed and sealed this 16th day of September 1969.

(SEAL)
Attest:

Edward M. Fletcher, Jr.                    WILLIAM E. SCHUYLER, JR.
Attesting Officer                              Commissioner of Patents